UNITED STATES PATENT OFFICE.

OTTO H. KRAUSE, OF JERSEY CITY, NEW JERSEY, ASSIGNOR TO THE F. O. MATTHIESSEN & WIECHERS SUGAR REFINING COMPANY, OF SAME PLACE.

PROCESS OF MANUFACTURING DOUBLE-CRYSTALLIZED SUGAR.

SPECIFICATION forming part of Letters Patent No. 372,030, dated October 25, 1887.

Application filed February 5, 1887. Serial No. 226,697. (No specimens.)

*To all whom it may concern:*

Be it known that I, OTTO H. KRAUSE, of Jersey City, New Jersey, have invented an Improvement in the Process of Manufacturing Double-Crystallized Sugar, of which the following is a specification.

The manufacture of so-called "double-crystallized" hard sugar has heretofore been practiced according to the methods described in Letters Patent of the United States No. 318,639 and Letters Patent of the United States No. 318,630.

It consists in charging a mass of soft sugar or granulated sugar, which has been pressed in a mold into the form of a cake or slab, with a saturated hot pure sugar solution or so-called "white liquor," and in then immersing the charged slab in a cold saturated white liquor to cool it off in order that a portion of the sugar of which the hot white liquor is composed may, as the temperature falls, crystallize throughout the mass of soft sugar or granulated sugar, and thereby firmly cement the particles of soft sugar or granulated sugar to each other and produce a body of hard sugar having the peculiar glistening appearance resulting from the presence of crystals not only upon its exterior but also upon its planes of cleavage when broken.

The present improvement is based upon the discovery that the process of cementation, by the crystallization of the white liquor absorbed by the soft sugar or granulated sugar, may be greatly hastened by taking advantage of the property possessed by sugar of forming, under certain conditions, supersaturated solutions in water; and the invention consists in reducing the temperature of the hot saturated white liquor to such a degree, before charging the soft or granulated sugar with it, that further cooling of the charged product is unnecessary.

In carrying out this improvement there is first prepared a saturated solution of pure sugar in water, which may contain from seventy to eighty per cent. of sugar, but is preferably made to contain seventy-two per cent. of sugar. This constitutes what is called the "charging-liquor," which may be prepared at temperatures ranging from 110° Fahrenheit to 190° Fahrenheit. The charging-liquor is cooled down from the temperature at which it has been prepared to a temperature, say, 40° lower, more or less, so that it becomes supersaturated, and may contain, say, from seven to twenty per cent. more dissolved sugar than it can permanently hold in solution. For example, if the solution is prepared at a temperature of 110° Fahrenheit, it is cooled down to, say, 60° Fahrenheit; or if it is prepared at 124° Fahrenheit, it is cooled down to, say, 80° Fahrenheit; or if prepared at 190° Fahrenheit, it is cooled down to 150° Fahrenheit, more or less. When thus cooled down, the solutions are supersaturated, and under ordinary conditions will retain their state of supersaturation for several hours; but if they are brought into contact with a relatively large surface of crystalline sugar, as they are when allowed to be absorbed by the soft sugar or granulated sugar slabs, they immediately begin to give up their excess of dissolved sugar, which rapidly forms into crystals and cements the particles of soft sugar or granulated sugar to each other.

It will be understood that if a very hard product is desired, the sugar solution which constitutes the charging-liquor may be saturated at a higher temperature than even 190° Fahrenheit, or it may be cooled down below the temperature at which it is prepared to a greater extent than 40°, so that it will possess a greater degree of supersaturation. It will be found, however, that a saturated solution prepared at from 120° to 140° Fahrenheit, and then cooled down, say, 40°, will form a charging-liquor which, upon being absorbed by the soft sugar or granulated sugar, will produce a crystallized sugar of remarkable hardness and brilliancy. It will be advantageous to cool the slabs of soft sugar or granulated sugar before charging them with the supersaturated solution.

This improvement, besides rendering it unnecessary to immerse the soft or granulated sugar slabs in a cold bath of white liquor, as heretofore practiced, also greatly diminishes the time required for the complete cementation of the particles of soft or granulated sugar to each other by the crystallization of the excess of sugar present in the charging-liquor. Under the described conditions crystallization takes place so rapidly that in from twenty to forty minutes after the slabs have been charged, according to the temperature of the charging-liquor and its degree of supersaturation, the slabs are transformed into solid cakes of hard sugar and are ready to be removed to the centrifugal machine and drained preparatory to being dried and cut or cracked into blocks in the usual manner.

What I claim as the invention is—

The improvement in the process of manufacturing hard sugar from soft sugar, herein described, which consists in causing a slab or body of soft or granulated sugar to absorb or be charged with a cold supersaturated aqueous solution of sugar prepared by first making a saturated solution of sugar in water at a relatively high temperature, and then cooling down said saturated solution to such temperature as is sufficient to transform it into the required supersaturated condition preparatory to its immediate use as a charging-liquor, substantially in the manner set forth.

O. H. KRAUSE.

Witnesses:
JOHN COOK,
ARTHUR KRAUSE.